United States Patent [19]

Katz

[11] 4,186,568
[45] Feb. 5, 1980

[54] TUNABLE LINK

[76] Inventor: Amnon Katz, 401 Forrest Hill La., Grand Prairie, Tex. 75051

[21] Appl. No.: 820,469

[22] Filed: Aug. 1, 1977

[51] Int. Cl.² ............................ F16C 1/00; F16C 3/00
[52] U.S. Cl. .......................................... 64/1 V; 64/6; 64/17 R; 64/1 S
[58] Field of Search ................... 64/1 V, 6, 17 R, 1 S

[56] References Cited

U.S. PATENT DOCUMENTS

| 1,645,343 | 10/1927 | Moorhouse | 64/1 V |
|---|---|---|---|
| 1,978,922 | 10/1934 | Wemp | 64/1 V |
| 2,067,287 | 1/1937 | Pearce | 64/1 V |
| 2,249,292 | 7/1941 | Kapitza | 64/1 V |
| 2,751,765 | 6/1956 | Rowland | 64/1 V |
| 3,680,407 | 8/1972 | Doehring | 64/1 V |
| 3,709,045 | 1/1973 | Krupick | 74/5 F |
| 3,791,169 | 2/1974 | Wright | 64/1 V |
| 3,858,411 | 1/1975 | Hiershig | 64/1 V |
| 4,036,030 | 7/1977 | Papst | 64/1 V |
| 4,062,600 | 12/1977 | Wyse | 74/5 F |

*Primary Examiner*—Ronald H. Lazarus
*Assistant Examiner*—R. C. Turner

[57] ABSTRACT

A coupling for usage in environments subject to vibrations which includes a universal joint disposed in series with a rod and coupled with a resilient bendable member that is rigidly attached to both sides of the universal joint.

3 Claims, 12 Drawing Figures

TUNABLE LINK

BACKGROUND

This invention relates to control rods used to transmit axial signals and subject to radial vibrations induced by the environment, such as the control rods in helicopters used to transmit control inputs to the rotor and tending to vibrate at the rotor blade passage frequency. The invention is a device for detuning the natural frequency of the rod from the frequency of the forcing function of the induced vibrations.

SUMMARY

The present invention teaches how to control the natural frequency of a control rod by incorporation of a mechanically simple and small link in series in the rod. The link does not affect adjacent structure and requires modification in only a short segment of the control rod itself.

The tunable link of this invention is comprised of a universal joint disposed in series in the rod and coupled with a resilient bendable member that attaches rigidly to both sides of the universal joint. The coupling is such that motion in the universal joint is not possible without bending the resilient bendable member.

The universal joint transmits the axial loads including the axial control signals. The resilient bendable member transmits all bending moments. This arrangment allows to maintain a high degree of axial strength and stiffness, as required by the application, through the design of the universal joint. At the same time it is possible to set the bending stiffness of the tunable link, and therefore of the rod, at a desired low value by the selection and design of the resilient bendable member. Thus it is possible to tune the natural frequency of the control rod to a desired low value without degrading the axial strength and rigidity.

The universal joint can have built in stops that limit its motion to a preselected amount. The purpose of this feature is, in the event of failure of the resilient bendable member, to prevent buckling of the rod. The rod, even with a failed resilient bendable member, is capable of transmitting compressive as well as tensile loads, and is therefore statically fail-safe as far as failure of the resilient bendable member is concerned.

PREFERRED EMBODIMENT

A preferred embodiment of the tunable link is described in the following and shown in the drawings. In the preferred embodiment the resilient bendable member is a sleeve with cutouts that surrounds the universal joint. The sleeve attaches to each side of the universal joint by interference fit. The cutouts reduce and regulate the bending stiffness of the sleeve.

BRIEF DISCUSSION OF THE DRAWINGS

FIG. 1 shows the link incorporated in a control rod.

FIGS. 2 and 3 are two views of same with internal parts of the link shown.

FIG. 4 shows the main parts that constitute the tunable link. The parts of the link are:

Figure 1:
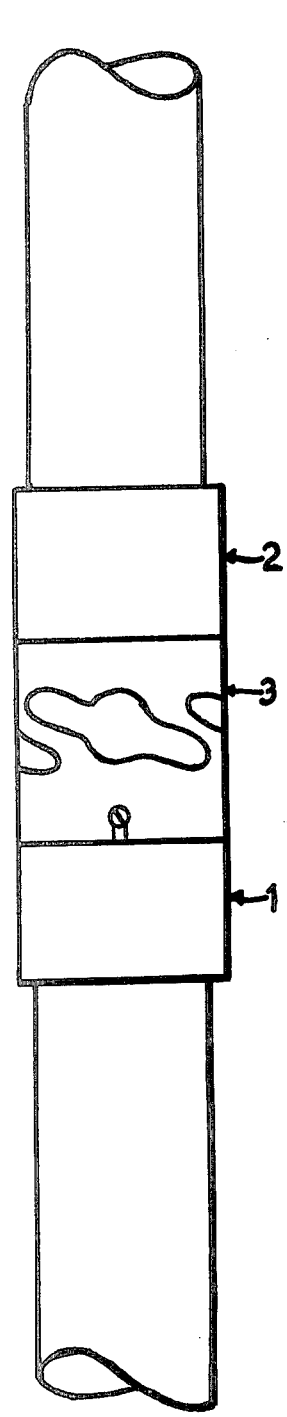
FIGS. 1 through 4 are drawings of the preferred embodiment.

1—adapter connecting to lower part of rod,
2—adapter connecting to upper part of rod,
3—sleeve that serves as the resilient bendable member,
4—bolt that joins the two adapters,
5—a substantially spherical universal joint bearing,
6—screw retaining the sleeve 3 from rotating.

DETAILED DESCRIPTION OF THE PREFERRED EMBODIMENT

The adapters 1 and 2 connect to the respective parts of the separated control rod by internal thread 7 and 8 respectively engaging matching thread on the two parts of the rod. The universal joint is formed by a rectangular tang 9 on item 1 and a fork comprised of two trapezoidal tangs 10 and 11 on item 2. The spherical bearing 5 is permanently installed in the cylindrical hole 12 in the tang 9. The tang 9 is disposed in the fork formed by 10 and 11, and the bolt item 4 passes through hole 13 in tang 10, through the bearing 5 and through hole 14 in tang 11. The bolt is secured in place by thread 15 in hole 14 mating matching thread on the bolt (item 4). Thread 15 is of the locking type. The bolt item 4 has no head, but features a screwdriver slot on the end opposite the thread (not shown).

Figure 2:
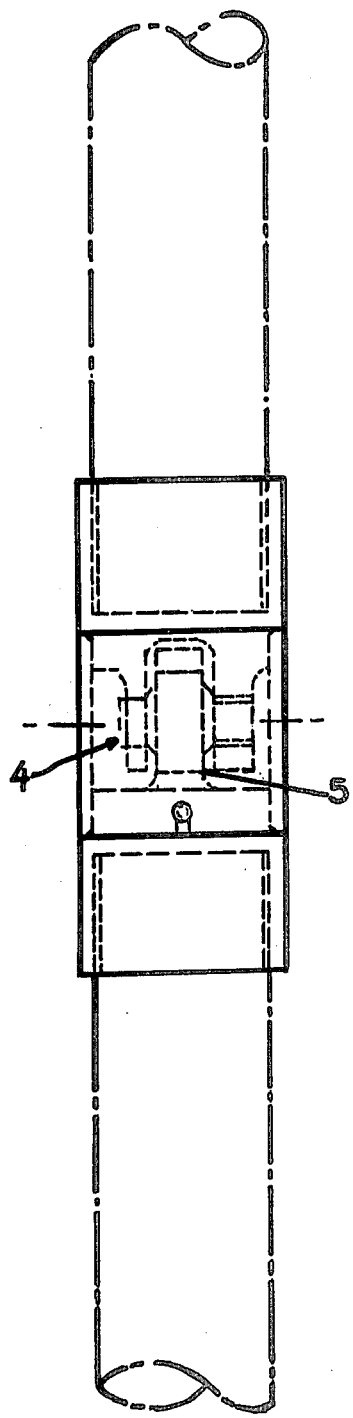
Figure 3:
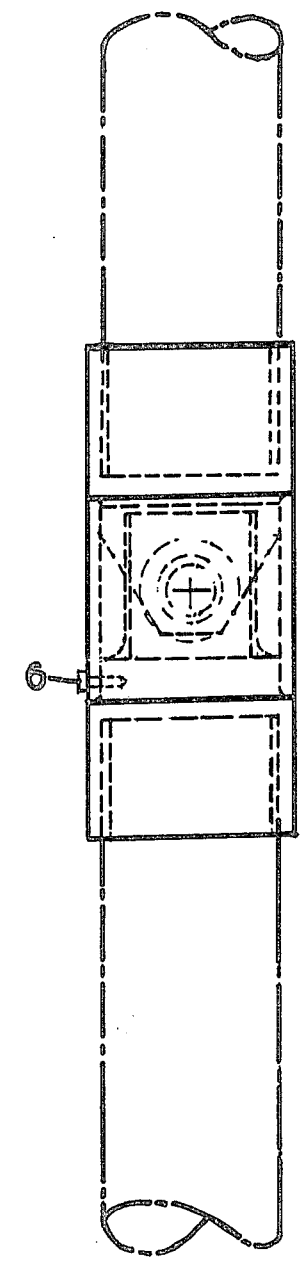
Figure 4A:
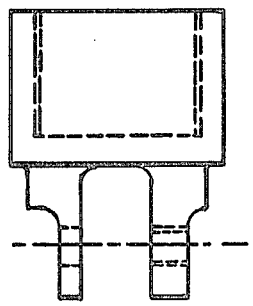
Figure 4B:
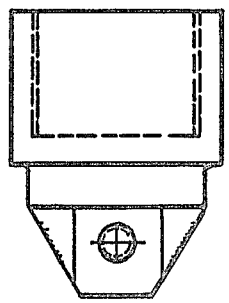
Figure 4E:
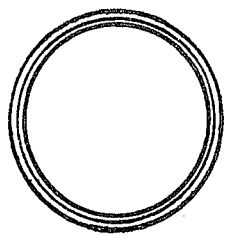
Figure 4C:
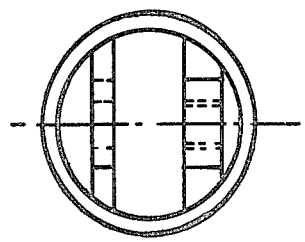
Figure 4F:
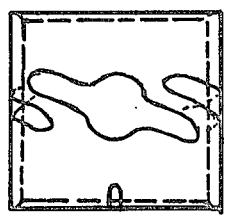
Figure 4D:
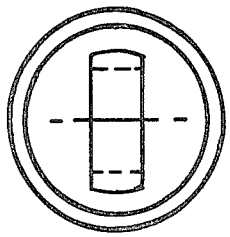
Figure 4G:
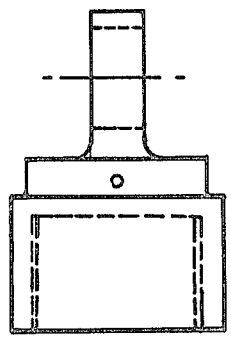
Figure 4H:
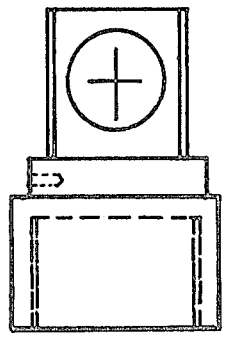
Figure 4I:

The sleeve 3 fits on adapters 1 and 2 as shown in FIGS. 2 and 3. The inner surface of the cylindrical sleeve 3 mates the cylindrical surface 16 on adapter 1 and the cylindrical surface 17 on adapter 2. The outer diameter of surfaces 16 and 17 being equal or slightly greater than the inner diameter of the sleeve 3, an interference fit is formed. The two ends of sleeve 3 rest against surfaces 18 and 19 on adapters 1 and 2 respectively. Thus no motion is possible in the universal joint without bending the sleeve 3.

The sleeve features cutouts 20 designed to reduce its bending stiffness as required to tune the control rod to the desired natural frequency for transverse vibrations. The shape of the cutouts 20 shown is by way of example only. The cutouts are to be designed for the particular application. Alternately, a series of interchangeable sleeves 3 with increasingly sizable cutouts can be used to achieve the tuning or detuning of the control rod by trial and error. The cutouts must meet one requirement, namely some part of the cutouts must be large enough for the bolt item 4 to pass through. This requirement is dictated by the method of assembly of the tunable link described below. Cutouts 20 in the drawings meet this requirement in the enlarged opening 21.

To assemble the tunable link, the sleeve 3 is mounted in position on adapter 2 with one end against surface 19, and with opening 21 aligned with hole 13. Adapter 1 with bearing 5 mounted permanently in place is inserted through the open end of sleeve 3, so that tang 9 is disposed in the fork formed by tangs 10 and 11, and surface 18 rests against the sleeve 3. The universal joint is completed by inserting the bolt 4 through opening 21, hole 13, the bearing 5, and into hole 14. The bolt is secured into thread 15 in hole 14 by use of a screwdriver inserted in opening 21. Once bolt 4 is secured in place, sleeve 3 is turned 90° relative to the adapters 1 and 2. Opening 21 is now misaligned with the bolt 4. If the bolt should become disengaged for any reason it cannot drop out of place because of sleeve 3. In this way sleeve 3 serves also as a retaining device for bolt 4. The sleeve 3 is secured in its position and prevented from rotating relative to adapters 1 and 2 by screw 6 inserted through slot 22 in sleeve 3 and engaged in thread 23 in adapter 1.

The main function of sleeve 3 is to serve as the resilient bendable member. The assembled tunable link is a compact cylindrical object with female threads 7 and 8 on the ends ready to mate the disconnected rod. (This method of connection is incidental to the invention.) The tunable link cannot be bent without bending the sleeve 3. With the universal joint offering no resistance to bending, the bending stiffness of the sleeve 3 determines the bending stiffness of the whole tunable link. If this stiffness is set low enough, it dominates the bending stiffness of the control rod and through it the natural frequency of the control rod for transverse vibrations. Large enough cutouts can lower the natural frequency of the rod and detune it from the forcing function of the environment. This can be achieved without changing the strength and stiffness of the rod for axial loads and inputs which is governed by the design of the universal joint and unaffected by cutouts in the sleeve.

The rectangular tang 9 is so proportioned that its top comes in contact with adapter 2 when motion in the universal joint reaches 7°. Thus even if sleeve 3 should for some reason fail, motion in the universal joint is restricted to 7°, and transverse buckling of the rod is limited.

While the invention has been described in detail in its preferred embodiment, it is to be understood that the words were used for description rather than limitation, and it is the appended claims which define the true spirit and scope of the invention.

I claim:

1. In a control rod for the transmission of axial signals that is subject to forced transverse vibrations, apparatus comprising:
   a universal joint disposed in series in said rod,
   a resilient bendable member rigidly coupled to said rod on either side of the universal joint,
   said resilient bendable member comprising a member generally in the form of a sleeve with cutout portions surrounding the said universal joint,
   said cutout portions being selected in size and shape to effect the detuning of the natural frequency of the control rod from the frequency of the forced vibrations.

2. Apparatus in accordance with claim 1 where the universal joint includes built in stops that, in the event of failure of the resilient bendable member, limit the motion in the joint to a preselected value.

3. Apparatus in accordance with claim 2 in which the sleeve serves as a retaining device for the bolt in the universal joint.

* * * * *